Figure 1:
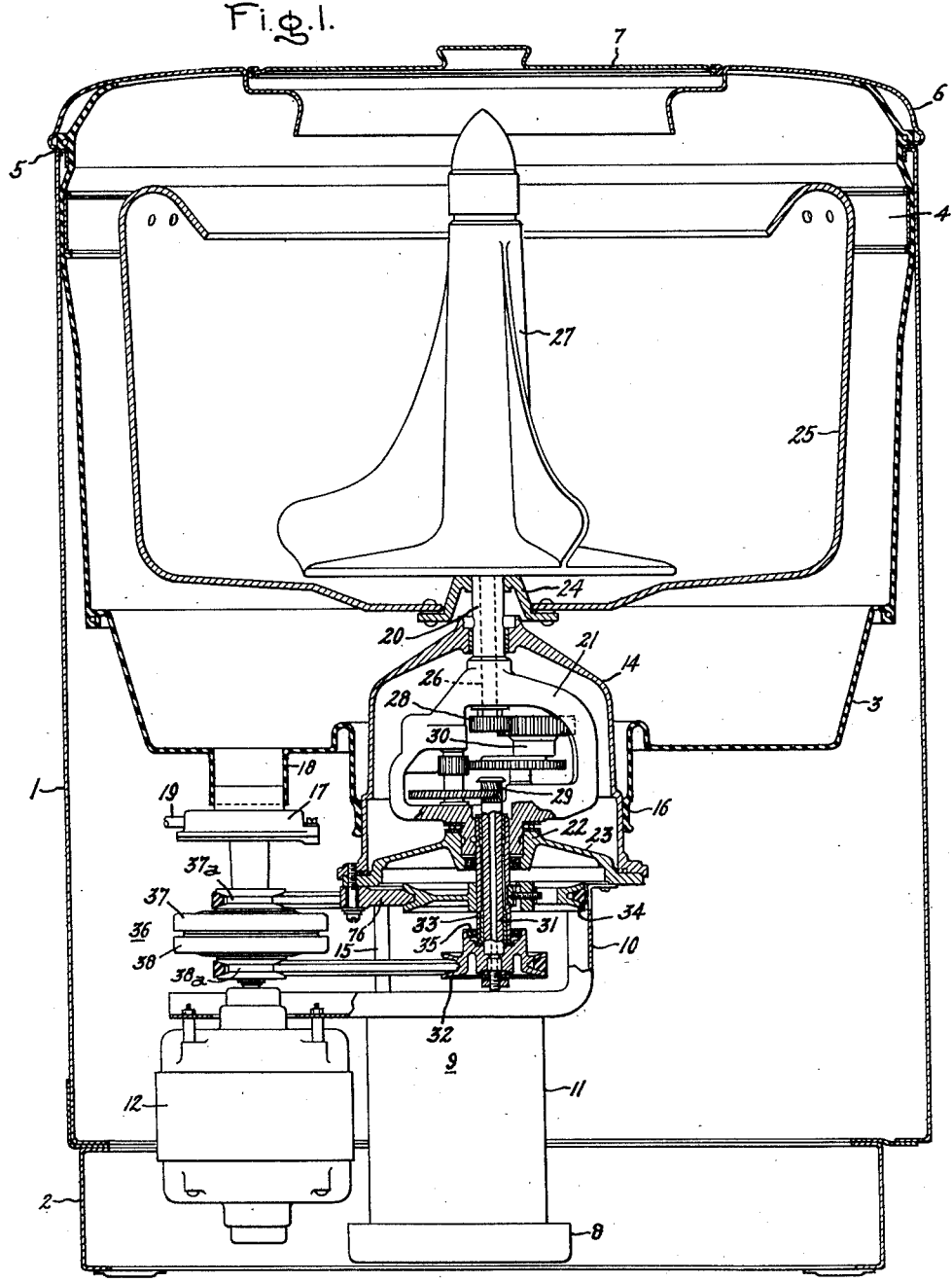

Inventor:
Jacob W. McNairy,
by Sheridan & Ross
His Attorney.

May 26, 1953
J. W. McNAIRY
2,639,618
TRANSMISSION AND CLUTCH FOR CLOTHES WASHERS
Original Filed May 26, 1950
3 Sheets-Sheet 2
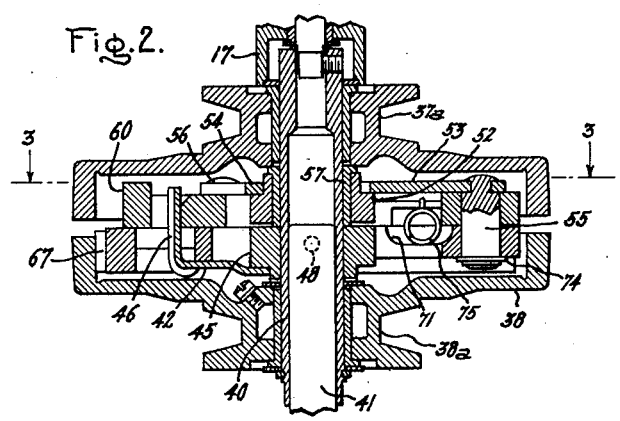
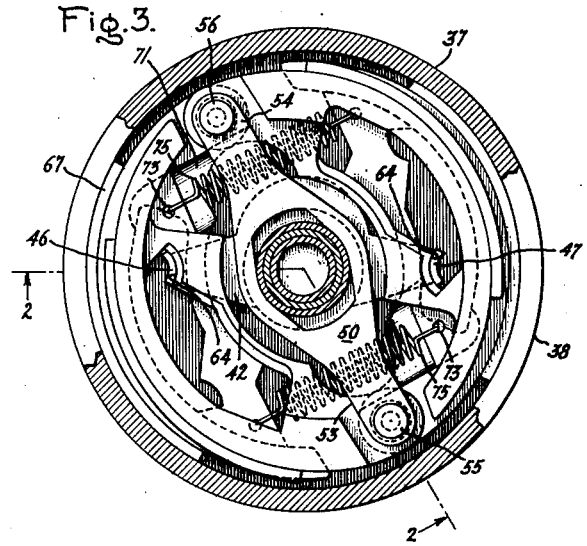
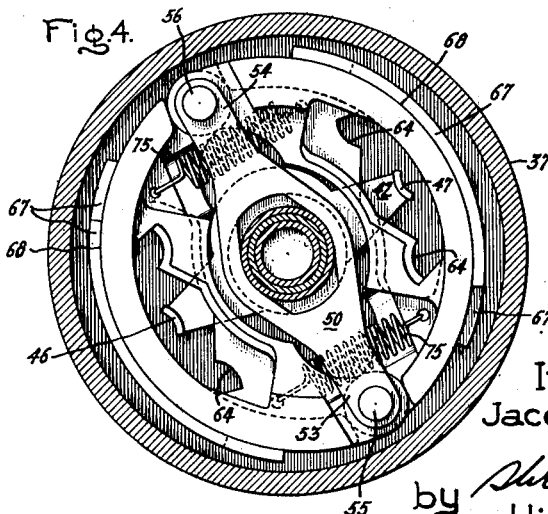
Inventor:
Jacob W. McNairy,
by *[signature]*
His Attorney.

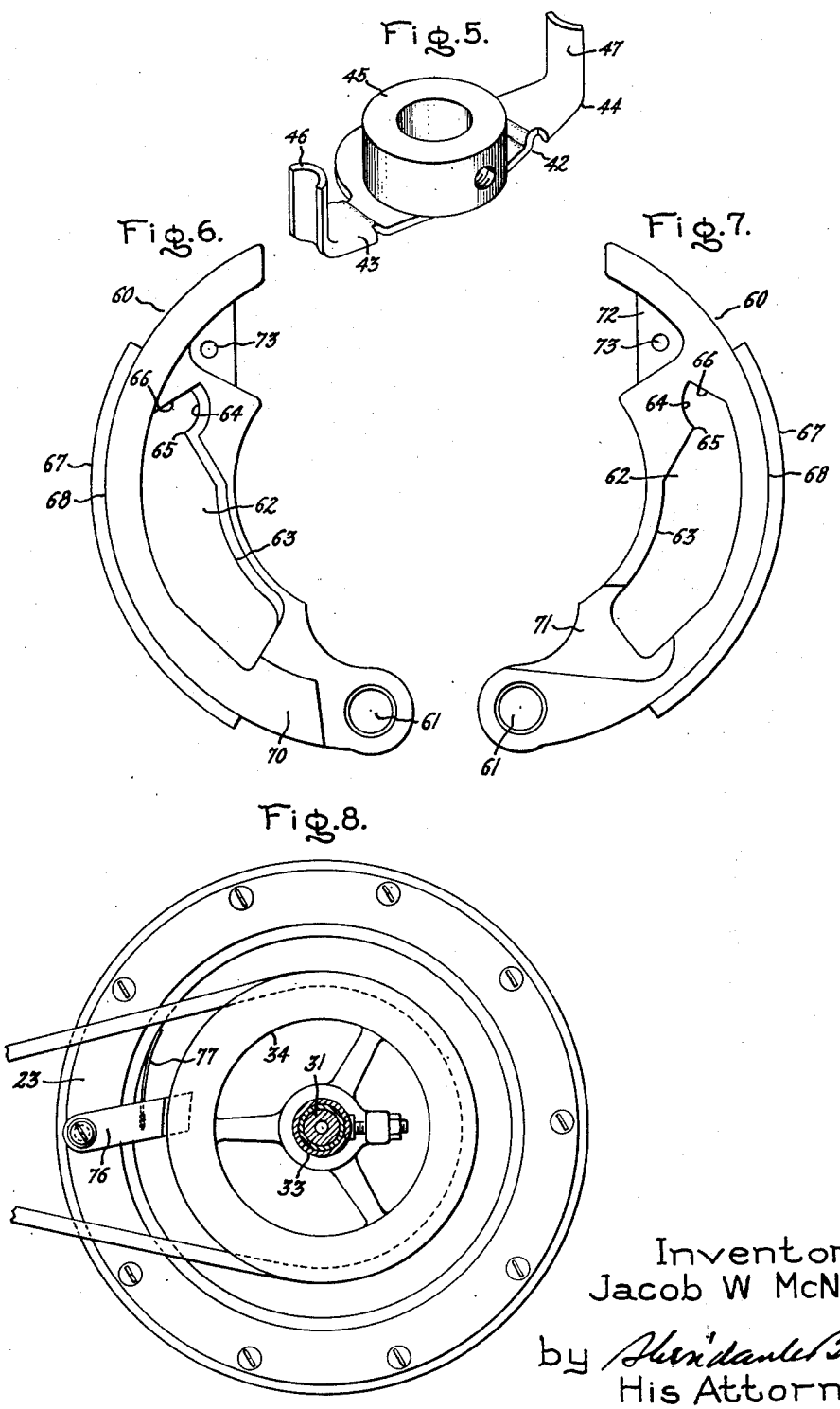

Patented May 26, 1953

2,639,618

UNITED STATES PATENT OFFICE 2,639,618

TRANSMISSION AND CLUTCH FOR CLOTHES WASHERS

Jacob W. McNairy, Westport, Conn., assignor to General Electric Company, a corporation of New York Original application May 26, 1950, Serial No. 164,427. Divided and this application August 23, 1951, Serial No. 243,311

6 Claims. (Cl. 192—3.5)

This invention is a division of my pending application Serial No. 164,427 filed May 26, 1950, for Drive Clutch for Washing Machines and the like, which is assigned to the General Electric Company, assignee of the present application.

It relates to an improved transmission for a clothes washing machine, and more specifically to a direction responsive transmission for selectively driving a clothes basket and clothes washing means within the basket.

An object of my invention is to provide an improved drive mechanism pursuant to which the operation of a washing machine may be changed from washing to centrifugal extraction merely by reversing the direction of rotation of the driving means.

Another object of my invention is to provide an improved transmission capable of selectively operating a pair of shafts in response to the direction of rotation of a reversible clutch drive means.

A still further object is to provide a transmission which selectively operates a pair of shafts and has means which automatically restrains one of the shafts from rotation in one direction.

In carrying out my invention I provide a clutch drive shaft which may be rotated in either direction to selectively drive a pair of clutch members each of which carries a sheave or other torque transmitting means. The respective sheaves are drivingly connected to a shaft which drives an oscillator mechanism and to a shaft which rotates a clothes receptacle. The latter shaft is provided with direction responsive means for restraining rotation of the receptacle during driving of the former shaft.

Other features and advantages of my invention will be apparent in the following detailed description of the presently preferred construction shown in the accompanying drawings in which Fig. 1 is a vertical sectional elevation of a washing machine embodying my improved drive means; Fig. 2 is a sectional elevation taken through a clutch which may be used with my invention, the section being taken on lines 2—2 of Fig. 3; Fig. 3 is a plan section of the clutch in Fig. 2 taken along lines 3—3 of Fig. 2; Fig. 4 is a view similar to Fig. 3 but showing the relative position of the drive shoes immediately following the instant of reversal of the drive motor; Fig. 5 is a perspective of the driver member; Figs. 6 and 7 are respectively obverse and reverse views of a clutch drive shoe; and Fig. 8 is a bottom plan view showing the spin basket drive sheave and snubber means for preventing progression of the basket during operation of the washing device.

Although my transmission may be adapted for use other than with washing machines, I have chosen to describe its operation with a domestic washing machine of well known type because of the special need in this application for a transmission for selectively driving a pair of shafts, one of which must be restrained from rotation during the driving of the other.

A commercially popular domestic washing machine (see Fig. 1) includes an outer casing 1 having a rigid base frame 2 and a tub 3 suitably secured within the casing as by a clamping band 4 and means for fastening an upper flange 5 of the tub to the upper periphery of the casing. As illustrated, the tub is molded from rubber or the like and is flexible; this is by way of example only, and is without importance as respects the instant invention. The cover 6 and removable lid 7 complete the casing structure. Fixed to a transverse frame member 8 extending between and secured to opposite walls of the base frame 2, is a mounting structure 9 which includes an angular support member 10 fixed to a resiliently mounted pedestal 11. An overhanging end of member 10 carries a drive motor 12. The member 10 supports a gear casing 14 by any suitable means; for example, by directly affixing the extremity of the member 10 to a base plate of the casing 14 and employing studs or equivalent spacer means 15. The mounting structure may be similar to that disclosed and claimed in the C. L. Reitz et al. application, Serial No. 164,382 filed on May 26, 1950, and assigned to my present assignee.

The gear casing 14 extends into the tub 3 by passage through a neck 16 thereof. As will be obvious, said neck is suitably fastened to the cylindrical wall of casing 14 by conventional clamping means (not shown) which insure against leakage from the tub. The motor 12 is drivingly associated with a pump 17 having an inlet clamped within a depending drain neck 18 of the tub. Said pump is unidirectional and when rotated in proper direction will discharge the contents of the tub 3 through outflow 19 connected to any suitable disposal conduit (not shown).

Extending from casing 14 is a tubular shaft 20 which is fixed to a gear frame 21 having a hub journaled in a bearing 22 in the casing base plate 23. Fixed to said shaft 20 is a collar 24 to which is affixed a basket 25 within which the clothes are washed and dried. Independently rotatable within the tubular shaft 20 is a shaft 26 carrying at its upper end a washing device or agitator 27. Shaft 26 carries at its lower end a pinion 28 which is in mesh with a gear train 30 driven by a pinion 29 affixed to the end of a drive shaft 31. Gear train 30 includes suitable sector gears and the like to cause an oscillation of the washing device 27. The gear train, for example, may be as shown and described in Patent Number 2,526,444 Woodson, dated October 17, 1950, for "Control for Automatic Washing Machine" and assigned to the General Electric Company, assignee of the present application. Shaft 31 has a sheave 32 fixed thereto; said shaft operates within a tubular shaft 33 pinned to the hub of gear frame 21 to drive the same. Shaft 33 is driven by a sheave 34 thereon. Escape of lubricant from the gear casing may be prevented by a suitable seal 35 within the extended hub of sheave 32.

When the basket is filled with water by a suitable means, not shown, the gear frame 21 is held stationary as later described and the gearing 30 oscillates shaft 26 and its thereon supported agitator 27. The basket 25 remains stationary during this operation for the reason that the basket is connected to gear frame 21 and will rotate only when said frame is rotated. When the basket is to be spun, shaft 33 is rotated and shaft 31 disconnected from power. The agitator 27 will rotate idly with the basket due to the coupling effect of the water content of the basket, friction drag, and other factors.

The respective washing and drying operations may be selectively accomplished by reversing the direction of rotation of the motor 12 and driving one or the other of the sheaves 32, 34 by means of a direction-responsive clutch 36.

An example of a direction responsive two-way drive clutch suitable for use with my transmission is shown in Figs. 2 and 3 and described and claimed in my aforementioned parent application. It comprises drums 37, 38 of equal inside diameter and journaled in opposing relationship on a shaft 40 which may conveniently be a sleeve telescoped over a drive shaft 41, see Fig. 2. According to preference or particular installation requirements the drive shaft may comprise the rotor shaft of a reversible motor or the output shaft of a reversing gear train externally driven. It is economical and structurally satisfactory to utilize the hubs of the respective clutch drum sheaves 37a, 38a for supporting the drums on shaft 40. It will be understood that whereas the respective sheaves 32, 34, 37a and 38a adapt the mechanism for belt drive, said sheaves may be supplanted by gears or equivalent when other power transmission systems are in order.

The means by which drive shaft torque is transmitted to one or the other of the clutch drums according to the rotation of the shaft include a drive 42, a carrier 50 and a plurality of clutch shoes 60. The driver (see Fig. 5) includes arm members 43, 44 extending from a hub 45 which fits over shaft 40 with close tolerance, said arm members respectively terminating in the fingers 46, 47. Where the driver is to transmit equal torque for both directions of rotation, it is important that the convex surfaces of the fingers be cylinders or sectors of cylinders of the same radius and that their axes be equally spaced from the axis of hub 45. Said hub is tapped to receive a screw 48 (Fig. 2) by means of which the hub is secured and not only to shaft 40 but to shaft 41, the respective shafts being radially drilled to receive the screw.

Carrier 50 includes an arm member welded or otherwise secured to hub 52 to provide the uniform arm portions 53, 54. Each said arm portion has a stud respectively 55, 56 secured thereto, the axes of said studs being equidistant from the axis of hub 52. By suitable means such as the sleeve bearing 57 the carrier 50 is freely rotatable on shaft 40.

Clutch shoes 60, shown in obverse and reverse respectively in Figs. 6 and 7, are arcuate structures having apertures 61 by means of which the shoes rotatably fit on the carrier arm studs. Each shoe is formed with an opening 62 of which an inner wall 63 provides a notch 64 remote from the pivot aperture 61. The radius of the notch is substantially the same as that of the convex wall of the respective fingers 46, 47. The notches hold the fingers against accidental disengagement from the inactive drive shoes in the event of a momentary interruption of power while the machine is up to speed, under which condition the spinning basket would drive the clutch, reversing the torque. The fingers enter the notches by camming past the peak 65 and seat against the end wall 66. The peak 65 is effective in preventing the reverse clutch torque from shifting the clutch to a point where it might operate the agitator clutch drum, as long as the speed is high enough so that centrifugal forces keep the shoes in engagement with the drive fingers. Each shoe is provided with a strip of friction material 67 to engage with the inner surface of the adjacent clutch drum. Said strip may be riveted or adhesively bonded to the outer drive shoe face 68 according to conventional practice. The woven or compressed materials commonly used for automobile brake linings and clutch facings are entirely satisfactory. The construction of the shoe is such as to dispose the center of gravity thereof toward the outer wall 68 and to provide an outer wall depth sufficient to insure adequate friction area. Each of these objectives is conveniently accomplished by making the thickness of the area 70 of the shoe substantially greater than that of the remainder. The respective thickness of the shoe areas appears to better advantage in Fig. 2. The reverse side (Fig. 7) is substantially planar except for a concavity 71 and a hollow 72, the latter providing a relatively thin web pierced by a spring securement opening 73.

The pairs of clutch shoes are arranged one over the other in a back-to-back relationship on the respective studs 55, 56. The shoes may be supported on the studs by conventional means such as a snap ring 74. Each clutch drum will be engaged by the friction material on shoes which are respectively pivoted at the opposite end of the carrier 50. In the arrangement in Fig. 2 the lowermost pair of shoes is in operative position with the respective friction surfaces engaging the lower clutch drum 38. The uppermost shoes as viewed in Fig. 3 are locked inactive by the engagement of the fingers 46, 47 within the respective notches 64 of the shoes. It will be noted that each of the inactive upper shoes is resiliently connected to a lower shoe by a spring 75 the ends of which hook through the spring receiving hole 73. The concavities 71 of the respective shoes are to accommodate the passage of the spring as better appears in Fig. 2.

In Fig. 3 it is assumed that the drive shaft and its associated driver 42 are rotating clockwise.

The fingers of the driver have cammed into the notches 64 of the upper shoes and the motor torque is being imposed directly upon the said upper shoes. These upper shoes, being pivotally affixed to the carrier 50, are therefore enforcing a clockwise rotation of said carrier. The lower shoes, of which the left hand shoe is pivoted on stud 56 and the right hand shoe on stud 55 as viewed in Fig. 3, are thrown outwardly by centrifugal force engendered by the rapid rotation of the carrier 50 and their respective friction members 67 are in frictional driving engagement with the drum 38. There is, of course, some tendency for the uppermost shoes to fly outward but this is limited by the respective fingers 46, 47. The springs 75, however, are placed under light tension and are constantly biasing all of the shoes to an inactive position.

When the motor is brought to a stop and then reversed, the driver 42 will disengage from the notch in which it had been seated and will traverse the openings in the superimposed shoes to reach the opposite end notches of the lower shoe. The springs 75 having brought the respective upper and lower shoes to the Fig. 4 position are holding the shoes out of engagement with either of the clutch drums 37 or 38, thereby giving the motor a free start. The carrier and the clutch shoes driven thereby pick up speed rapidly and under centrifugal force the upper shoes will swing outwardly for frictional engagement with the wall of clutch member 37. Even then, the initial slippage along said wall delays the loading of the motor. The free start and gradual load imposition permits the motor 12 to be of the relatively less expensive resistance start type despite the relatively low starting torque characteristic of said motors.

The sheave 38a is belt connected to sheave 32 which is affixed to the end of shaft 31 which drives the gear train for operation of the agitator shaft 26, as previously explained. The direction of rotation of said shaft is counterclockwise as viewed in Fig. 8. The agitator shaft 26 will oscillate only if gear frame 21 is held against rotation in the same direction as the shaft 31. This may conveniently be accomplished by holding the sheave 34 against rotation inasmuch as said sheave is keyed to the drive shaft 33 which in turn is pinned to hub 24 of the gear frame 21. Accordingly, I employ a snubber 76 pivotally mounted on the base plate 23 of the gear casing 14 and biased, as by spring 77, to seat within the belt groove of sheave 34. By having the snubber 76 engage with the sheave in angular relation opposing the rotation of sheave 32, sheave 34 is restrained against counterclockwise rotation. The agitator will make one-half of its stroke within a stationary basket 25 although the basket is relatively free to progress under the influence of water movement during the opposite portion of the agitator stroke. However, the agitator torque during said last-named portion of its stroke is substantially less and correspondingly the basket 25 lags behind the agitator movement to such an extent that there is at all times a relative movement of the agitator with respect to the basket. This insures adequate turnover of the clothes within the washing liquid. When the motor is reversed to operate the upper clutch shoe 37 its associated sheave 37a drives sheave 34 through the belt illustrated and the snubber idles against the rotating sheave 34. The gear frame 21 is thereby rotated as a unit, and basket 25 is driven at centrifuging speed.

While I have shown a particular embodiment of my invention, it will be understood, of course, that I do not wish to be limited thereto since many modifications may be made; and I therefore contemplate by the appended claims to cover any such modifications as fall within the true spirit and scope of my invention.

What I claim as new and desire to secure by Letters Patent of the United States is:

1. In a washing machine of the type having a basket in which the clothes are washed and then damp dried by rapidly rotating the basket, means including a gear frame for mounting the basket for rotation on a vertical axis, a fixed casing for said gear frame providing bearing means therefor, a shaft journaled in said casing and secured to said frame for rotating the same, a clothes washing means for oscillation within said basket, a gear train within said gear frame for effecting such oscillation, and shaft means for driving said gear train: the combination of a reversible drive motor fixed relative to said casing, a bi-directional clutch having a pair of driving members arranged selectively to be connected to the drive motor according to the direction of rotation thereof, power transfer means connecting said clutch members respectively to the gear frame shaft and the gear train shaft for driving the same, and a snubber member pivotally mounted on said casing and biased angularly against said power transfer means of the gear frame shaft and positioned to prevent rotation thereof in the direction of rotation of said gear train shaft while permitting free rotation in the opposite direction.

2. In a washing machine of the type having a basket in which the clothes are washed and then damp dried by rapidly rotating the basket, means including a gear frame for mounting the basket for rotation on a vertical axis, a fixed casing for said gear frame providing bearing means therefor, a shaft journaled in said casing and secured to said frame for rotating the same, a sheave affixed to said shaft externally of said casing, a clothes washing means for oscillation within said basket, a gear train within said gear frame for effecting such oscillation, and means including a second drive sheave for driving said gear train: the combination of a reversible drive motor fixed relative to said casing, a bi-directional clutch, said clutch having a pair of driving members arranged selectively to be connected to the drive motor according to the direction of rotation thereof, means connecting said clutch members respectively to the sheaves for driving the same, and a stop member pivotally mounted on said casing and resiliently held in snubbing relationship with said gear frame sheave in angular relation to its periphery and directed to oppose its rotation in the direction of rotation of said gear train sheave.

3. In a washing machine of the type having a basket in which the clothes are washed and then damp dried by rapidly rotating the basket, means including a gear frame for mounting the basket for rotation on a vertical axis, a fixed casing for said gear frame providing bearing means therefor, a shaft journaled in said casing and secured to said frame for rotating the same, a sheave affixed to said shaft externally of said casing, a clothes washing means for oscillation within said basket, a gear train within said gear frame for effecting such oscillation, and means including a second drive sheave for driving said gear train: the combination of a reversible drive motor fixed relative to said casing, a bi-directional clutch, said clutch having a pair of driving members arranged selectively to be connected to the drive motor according to the direction of rotation thereof, means connecting said clutch members respectively to the sheaves for driving the same, and a direction responsive snubber brake biased against said gear frame sheave and operable in response to the rotation of said sheave opposite to the normal driven rotation of its clutch member to snub said sheave.

4. In a washing machine of the type having a basket in which the clothes are washed and then damp dried by rapidly rotating the basket, means for mounting the basket for rotation on a vertical axis, a fixed casing providing bearing means therefor, a shaft journaled in said casing and secured to said basket for rotating the same, a clothes washing means for oscillation within said basket, a gear train for effecting such oscillation, and shaft means for driving said gear train: the combination of a reversible drive motor fixed relative to said casing, a bi-directional clutch having a pair of driving members arranged to be connected selectively to the drive motor according to the direction of rotation thereof, means connecting said clutch members respectively to the basket shaft and the gear train shaft for driving the same, and a direction responsive snubber brake pivotally mounted on said fixed casing and operable in response to rotation of said basket shaft oppositely to its driven direction to restrain said shaft.

5. In a washing machine of the type having an oscillatory agitator for washing action and a clothes basket rotatable at high speed for fluid extraction, a reversible power source, a bi-directional clutch having a pair of torque transmitting members arranged to be driven selectively by said power source in response to the direction of rotation thereof, a gear train for oscillating said agitator, a fixed casing, a frame carrying said gear train and said clothes basket for rotation within said casing, power transmission means interconnecting said gear train with one of said torque transmitting members and said frame with the other of said torque transmitting members, and a unidirectional snubber brake cooperable with the power transmission means associated with said frame to restrain rotation of said frame in a direction corresponding to the input to said gear train while permitting free rotation in the opposite direction.

6. In a washing machine, a clothes basket rotatable at high speed, an oscillatory agitator within said basket and independently rotatable, a frame connected to said clothes basket and including a shaft by which it may be rotated, a gear train carried by said frame and having a shaft coaxial with said frame shaft, casing means including bearings for rotatably supporting said frame and its shaft, a driven member affixed to said frame shaft, a unidirectional snubbing brake pivotally mounted on said casing and biased against said driven member to permit its rotation only in a given direction, a reversible electric motor, a bi-directional clutch driven from said motor and having a pair of driving members, said clutch selectively connecting one of said driving members to the motor upon rotation in said given direction and the other driving member to the motor on rotation in an opposite direction, means connecting said driven member to said one driving member, and means connecting said gear train shaft to said other driving member.

JACOB W. McNAIRY.

References Cited in the file of this patent
UNITED STATES PATENTS

| Number | Name | Date |
|---|---|---|
| 1,688,555 | Rankin | Oct. 23, 1928 |
| 1,987,436 | Flori | Jan. 8, 1935 |
| 2,441,926 | Zahn et al. | May 18, 1948 |
| 2,485,622 | Bariffi | Oct. 25, 1949 |
| 2,583,168 | Fields | Jan. 22, 1952 |